United States Patent [19]

Scherowsky et al.

[11] Patent Number: 4,532,069
[45] Date of Patent: Jul. 30, 1985

[54] ANTHRAQUINONE DYESTUFFS FOR LIQUID CRYSTAL DIELECTRICS

[75] Inventors: Günter Scherowsky; Michael Bütow, both of Berlin, Fed. Rep. of Germany

[73] Assignee: Merck Patent Gesellschaft mit beschränkter Haftung, Darmstadt, Fed. Rep. of Germany

[21] Appl. No.: 564,865

[22] Filed: Dec. 23, 1983

[30] Foreign Application Priority Data

Dec. 24, 1982 [DE] Fed. Rep. of Germany ....... 3247896

[51] Int. Cl.³ .................... C09K 3/34; G02F 1/13; C09B 1/02; C09B 1/04; C09B 1/50; G09F 9/35

[52] U.S. Cl. ................. 252/299.1; 350/349; 260/380; 260/381; 260/383; 260/384

[58] Field of Search ..... 252/299.1; 350/349; 260/380, 381, 383, 384

[56] References Cited

U.S. PATENT DOCUMENTS

| 4,232,950 | 11/1980 | Benham | 252/299.1 |
| 4,273,929 | 6/1981 | Boller et al. | 252/299.1 |
| 4,304,683 | 12/1981 | Morinafa et al. | 252/299.1 |
| 4,360,447 | 11/1982 | Morinafa et al. | 252/299.1 |
| 4,363,743 | 12/1982 | Moeller et al. | 252/299.1 |
| 4,376,715 | 3/1983 | Cognard et al. | 252/299.1 |

FOREIGN PATENT DOCUMENTS

| 26004 | 4/1981 | European Pat. Off. | 252/299.1 |
| 38460 | 10/1981 | European Pat. Off. | 252/299.1 |
| 75173 | 2/1983 | European Pat. Off. | 252/299.1 |
| 93367 | 11/1983 | European Pat. Off. | 252/299.1 |
| 1400160 | 7/1964 | France | 252/299.1 |
| 1439370 | 5/1965 | France | 252/299.1 |
| 49-55968 | 5/1974 | Japan | 252/299.1 |
| 2037803 | 7/1980 | United Kingdom | 252/299.1 |
| 2069518 | 8/1981 | United Kingdom | 252/299.1 |
| 2086409 | 5/1982 | United Kingdom | 252/299.1 |

OTHER PUBLICATIONS

Cognard, J., et al., Mol. Cryst. Liq. Cryst., vol. 70, pp. 1–19, (1981).
CAS, Registry Handbook, Number Section, 1965–1971, RNS 5521-35-7 and 5521-37-9, and RN 4702-66-3.
Chem. Abstracts 64. 12 582c, (1966).
Helv. Chim. Acta 59. 2999, (1976).

*Primary Examiner*—Teddy S. Gron
*Attorney, Agent, or Firm*—Millen & White

[57] ABSTRACT

New anthraquinone dyestuffs of the general formula I

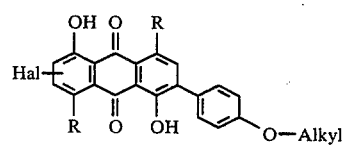

wherein Hal is a halogen atom and the two radicals R are each H or $NH_2$ and the alkyl group has 1–8 C atoms, exhibit a high order parameter and are suitable for use as components of liquid-crystal dielectrics.

14 Claims, No Drawings

ANTHRAQUINONE DYESTUFFS FOR LIQUID CRYSTAL DIELECTRICS

BACKGROUND OF THE INVENTION

In electro-optical display elements containing liquid-crystal dielectrics, the electro-optical effect of a display can be produced by incorporating pleochroic dyestuffs (the "guest phase") in a liquid-crystal matrix (the "host phase"). In this connection compare the reviews by COX, *Mol. Cryst. Liq. Cryst.*, volume 55, pages 1-32 (1979); JONES and REEVE, ibid., volume 60, pages 99-110 (1980); GRAY, *Chimia*, volume 34, pages 47-58 (1980) and the literature quoted in these references, all of which are incorporated by reference herein.

However, the dyestuffs used hitherto for this purpose only fulfil inadequately the requirements set for them (for example a high order parameter, satisfactory solubility in the host phase, stability to UV radiation and visible light and stability to voltages up to about 20 V).

SUMMARY OF THE INVENTION

It is an object of this invention to provide pleochroic dyestuffs which do not have the disadvantages of the known dyestuffs or only have these disadvantages to a lesser extent and which are suitable for use as components of liquid-crystal dielectrics.

Upon further study of the specification and appended claims, further objects and advantages of this invention will become apparent to those skilled in the art.

These objects have been achieved by providing new anthraquinone dyestuffs, 1,5-dihydroxy-2-p-alkoxyphenyl-6(or 7)-halogenoanthraquinones, of formula I

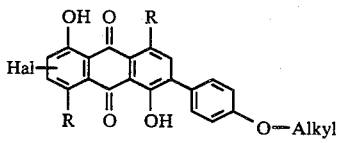

wherein Hal is a halogen atom and the two radicals R are each H or $NH_2$ and the alkyl group has 1-8 C atoms.

It has been found that these compounds of the formula I possess a surprisingly high order parameter and are readily soluble in liquid-crystal matrices. In addition, they are stable to UV radiation and visible light and also to the necessary voltages, and also have a good stability to chemicals. Typical high-order parameters are in the range of 0.6 to 0.8.

DETAILED DESCRIPTION

A "2-(p-methoxyphenyl)-4,8-diamino-1,5-dihydroxyanthraquinone", its 7-chloro derivative and its 7-bromo derivative and also its "2-(p-ethoxyphenyl) analogue" and the 7-chloro derivative thereof are known from *Chem. Abstracts* 64, 12,582c (1966). In reality, however, these compounds are the corresponding 3-(p-methoxyphenyl) or 3-(p-ethoxyphenyl) isomers (compare *Helv. Chim. Acta* 59, 2,999 et seq. (1976) and the literature quoted in this reference).

In contrast, therefore, the compounds of the formula I are as yet new.

The invention relates to the compounds of the formula I, in particular the preferred representatives of the latter, in which the radial Hal is in the 6-position and/or is Cl, or further bromine, and/or wherein the alkyl group is linear and is methyl, or, secondarily, is ethyl, propyl, butyl, pentyl, hexyl, heptyl or octyl. Fluorine and iodine are also suitable halogens and the alkyl group can be branched.

The invention also relates to a process for preparing compounds of formula I, wherein a 4,8-diamino-1,5-dihydroxy-2-p-alkoxyphenylanthraquinone is oxidized to the quinoneimine, an addition reaction is carried out between the latter and a hydrogen halide, and, if desired, the resulting 4,8-diamino-1,5-dihydroxy-6-(or 7)-halogeno-2-p-alkoxyphenylanthraquinone (I, $R^1=R^2=NH_2$) is converted into the corresponding 6(or 7)-halogeno-1,5-dihydroxy-2-p-alkoxyphenylanthraquinone (I, $R^1=R^2=H$) by diazotization and reduction. This invention also relates to the use of the compounds of the formula I as components of liquid-crystal dielectrics for electro-optical display elements, to liquid-crystal dielectrics for electro-optical display elements containing a dyestuff, which dielectric contains at least one dyestuff of the formula I and to electro-optical display elements, particularly elements based on a guest-host liquid-crystal cell, which contain a liquid-crystal dielectric of this type.

The compounds of the formula I are, moreover, prepared by methods which are in themselves known, such as are described in the literature (for example in the standard literature relating to the preparation of anthraquinone dyestuffs), specifically under reaction conditions which are known and suitable for the reactions mentioned. In these reactions it is also possible to make use of variants which are in themselves known but not described here in greater detail.

The starting materials can, if desired, also be formed in situ, in a process in which they are not isolated from the reaction mixture, but are immediately reacted further to give the compounds of the formula I. This applies particularly to the quinoneimines mentioned.

The compounds of the formula I are preferably prepared by oxidizing a compound corresponding to the formula I, but carrying an H atom instead of Hal, to give the corresponding quinoneimine, preferably by means of active $MnO_2$ in a mineral acid, such as sulfuric acid, at temperatures between about 0° and 50°, preferably 15° and 25°, and by subsequently carrying out an addition reaction with a hydrogen halide. The latter is preferably produced in situ, by adding to the sulfuric acid solution, after filtration, an appropriate salt, such as NaF, NaCl, NaBr or NaI, or an appropriate K salt, and allowing the mixture to react for some time at approximately the same temperature. As a rule, a mixture of (principally) 6-halogeno compounds and (a smaller quantity) of 7-halogeno compounds of the formula I (R=$NH_2$) is then formed. The 6- and 7-halo compounds can be conventionally separated.

If desired, the resulting amino compounds I (R=$NH_2$) can then be deaminated by diazotizing them and reducing the products. This is effected particularly advantageously by means of an alkyl nitrite, for example isoamyl nitrite, in the presence of a salt, ester or amide of formic acid, for example dimethylformamide, at temperatures between 20° and 60°, in particular at about 40°.

The starting materials required for the process of this invention are all known or conventionally preparable from starting materials which are known or in turn conventionally preparable.

The dielectrics according to the invention comprise 2 to 15, preferably 3 to 12, components, including at least one anthraquinone dyestuff of the formula I. The other constituents are preferably selected from nematic or nematogenic substances, in particular the known substances belonging to the classes comprising azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbenzenes, 4,4'-biscyclohexylbiphenyls, decalins, perhydrophenanthrenes, bicyclooctanes, phenylpyrimidines, cyclohexylpyrimidines, phenyldioxanes, cyclohexyldioxanes, optionally halogenated stilbenes, benzyl phenyl ethers, tolanes and substituted cinnamic acids. The most important compounds which are suitable as constituents of liquid-crystal host materials can be characterised by the formula II $$R^1-A-E-G-R^2 \qquad II$$

wherein A and G are each a carbocyclic or heterocyclic ring system from the group comprising 1,4-disubstituted benzene and cyclohexane rings, 4,4'-disubstituted biphenyl, phenylcyclohexane and cyclohexylcyclohexane systems, decalins, perhydrophenanthrenes, bicyclooctanes, 2,5-disubstituted pyrimidine and 1,3-dioxane rings, 2,6-disubstituted naphthalene, dihydronaphthalene, tetrahydronaphthalene, quinazoline and tetrahydroquinazoline, E is

| —CH=CH— | —N(O)=N— |
| —CH=CR³ | —CH=N(O)— |
| —C≡C— | —CH₂—CH₂— |
| —CO—O— | —CH₂—O— |
| —CO—S— | —CH₂—S— |
| —CH=N— | —COO—Ph—COO— |
| —N=N— | or a C—C single bond, |

$R^1$ and $R^2$ are alkyl, alkoxy, alkanoyloxy or alkoxycarbonyloxy having up to 18, preferably up to 8, carbon atoms, or one of these radicals can also be CN, NC, NO₂, CF₃, F, Cl or Br, and $R^3$ is halogen, preferably chlorine, or CN. In most of these compounds, $R^1$ and $R^2$ are different from one another, one of these radicals generally being an alkyl or alkoxy group. Many substances of this type or mixtures thereof are available commercially.

As a rule, the dielectrics according to the invention contain 0.1 to 15, preferably 0.3 to 10 and particularly 0.3 to 3, percent by weight of one or more compounds of the formula I. The dielectrics are prepared in a manner which is in itself customary, for example by dissolving the constituents in one another, preferably at an elevated temperature.

The dielectrics can be modified by means of suitable additives in such a way that they can be used in all the hitherto disclosed types of guest-host display elements. Additives of this type are known to those skilled in the art and are described in detail in the literature. For example, substances for modifying the dielectric anisotropy, the viscosity, the conductivity and/or the orientation of the nematic phases can be added. Substances of this type are described, for example, in German Offenlegungsschriften Nos. 2,209,127, 2,240,864, 2,321,632, 2,338,281, 2,450,088, 2,637,430, 2,853,728 and 2,902,177.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(a) A mixture of 2.1 g of 4,8-diamino-1,5-dihydroxy-2-p-methoxyphenylanthraquinone (which can be prepared from 1,5-dihydroxy-4,8-dinitroanthraquinone, for method see German Offenlegungsschrift No. 3,007,198), 32 g of 60% $H_2SO_4$, and 3 g of active $MnO_2$ is stirred for 1 hour at 20°, the mixture is filtered and 1 g of NaCl is added to the filtrate, which contains the corresponding quinoneimine. After stirring for half an hour, the mixture is poured into ice-water and the product is filtered off. The crude product is chromatographed over silica gel using petroleum ether/ether mixtures. The main product obtained is 4,8-diamino-6-chloro-1,5-dihydroxy-2-p-methoxyphenylanthraquinone, m.p. 310° (decomposition); Rf 0.41 (silica gel; 3:2 ether/petroleum ether). 4,8-diamino-7-chloro-1,5-dihydroxy-2-p-methoxyphenylanthraquinone, Rf 0.45 (silica gel; 3:2 ether/petroleum ether) is also formed.

(b) 330 mg of 4,8-diamino-6-chloro-1,5-dihydroxy-2-p-methoxyphenylanthraquinone are dissolved in 6 ml of dimethylformamide, and 1 ml of isoamyl nitrite is added dropwise at 40°. After stirring for 1½ hours, the solvent is removed by distillation and the residue is purified over silica gel using petroleum ether/toluene. This gives 6-chloro-1,5-dihydroxy-2-p-methoxyphenylanthraquinone, m.p. 229°.

7-Chloro-1,5-dihydroxy-2-p-methoxyphenylanthraquinone is obtained analogously from the 7-chloro isomer.

The following are obtained analogously from the corresponding 4,8-diamino-1,5-dihydroxy-2-p-alkoxyphenylanthraquinone:
4,8-Diamino-6-chloro-1,5-dihydroxy-2-p-ethoxyphenylanthraquinone
4,8-diamino-7-chloro-1,5-dihydroxy-2-p-ethoxyphenylanthraquinone
4,8-diamino-6-chloro-1,5-dihydroxy-2-p-propoxyphenylanthraquinone
4,8-diamino-7-chloro-1,5-dihydroxy-2-p-propoxyphenylanthraquinone
4,8-diamino-6-chloro-1,5-dihydroxy-2-p-butoxyphenylanthraquinone
4,8-diamino-7-chloro-1,5-dihydroxy-2-p-butoxyphenylanthraquinone
4,8-diamino-6-chloro-1,5-dihydroxy-2-p-pentoxyphenylanthraquinone
4,8-diamino-7-chloro-1,5-dihydroxy-2-p-pentoxyphenylanthraquinone 4,8-diamino-6-chloro-1,5-dihydroxy-2-p-hexoxyphenylanthraquinone
4,8-diamino-7-chloro-1,5-dihydroxy-2-p-hexoxyphenylanthraquinone
4,8-diamino-6-chloro-1,5-dihydroxy-2-p-heptoxyphenylanthraquinone
4,8-diamino-7-chloro-1,5-dihydroxy-2-p-heptoxyphenylanthraquinone
4,8-diamino-6-chloro-1,5-dihydroxy-2-p-octoxyphenylanthraquinone and
4,8-diamino-7-chloro-1,5-dihydroxy-2-p-octoxyphenylanthraquinone and the following are obtained from these by diazotisation and reduction:
6-chloro-1,5-dihydroxy-2-p-ethoxyphenylanthraquinone 7-chloro-1,5-dihydroxy-2-p-ethoxyphenylanthraquinone
6-chloro-1,5-dihydroxy-2-p-propoxyphenylanthraquinone
7-chloro-1,5-dihydroxy-2-p-propoxyphenylanthraquinone
6-chloro-1,5-dihydroxy-2-p-butoxyphenylanthraquinone
7-chloro-1,5-dihydroxy-2-p-butoxyphenylanthraquinone
6-chloro-1,5-dihydroxy-2-p-pentoxyphenylanthraquinone
7-chloro-1,5-dihydroxy-2-p-pentoxyphenylanthraquinone
6-chloro-1,5-dihydroxy-2-p-hexoxyphenylanthraquinone
7-chloro-1,5-dihydroxy-2-p-hexoxyphenylanthraquinone
6-chloro-1,5-dihydroxy-2-p-heptoxyphenylanthraquinone
7-chloro-1,5-dihydroxy-2-p-heptoxyphenylanthraquinone
6-chloro-1,5-dihydroxy-2-p-octoxyphenylanthraquinone and
7-chloro-1,5-dihydroxy-2-p-octoxyphenylanthraquinone.

EXAMPLE 2

The following are obtained analogously to Example 1 by an addition reaction with HF, HBr or HI:
4,8-diamino-6-fluoro-1,5-dihydroxy-2-p-methoxyphenylanthraquinone
4,8-diamino-7-fluoro-1,5-dihydroxy-2-p-methoxyphenylanthraquinone
4,8-diamino-6-bromo-1,5-dihydroxy-2-p-methoxyphenylanthraquinone
4,8-diamino-7-bromo-1,5-dihydroxy-2-p-methoxyphenylanthraquinone
4,8-diamino-6-iodo-1,5-dihydroxy-2-p-methoxyphenylanthraquinone and
4,8-diamino-7-iodo-1,5-dihydroxy-2-p-methoxyphenylanthraquinone
and the following are obtained from these by diazotisation and reduction:
6-fluoro-1,5-dihydroxy-2-p-methoxyphenylanthraquinone
7-fluoro-1,5-dihydroxy-2-p-methoxyphenylanthraquinone
6-bromo-1,5-dihydroxy-2-p-methoxyphenylanthraquinone
7-bromo-1,5-dihydroxy-2-p-methoxyphenylanthraquinone
6-iodo-1,5-dihydroxy-2-p-methoxyphenylanthraquinone and
7-iodo-1,5-dihydroxy-2-p-methoxyphenylanthraquinone.

The following examples relate to dielectrics according to the invention:

EXAMPLE A 0.37% of 4,8-diamino-6-chloro-1,5-dihydroxy-2-p-methoxyphenylanthraquinone are dissolved in a liquid-crystal mixture consisting of:
24% of p-(trans-4-propylcyclohexyl)-benzonitrile,
36% of p-(trans-4-pentylcyclohexyl)-benzonitrile,
25% of p-(trans-4-heptylcyclohexyl)-benzonitrile and
15% of 4-cyano-4'-(trans-4-pentylcyclohexyl)-biphenyl.
The resulting dielectric exhibits absorption maxima at 600 and 645 nm.

An analogous dielectric containing 4,8-diamino-6-chloro-1,5-dihydroxy-2-p-butoxyphenylanthraquinone similarly exhibits $\eta_{max}$ at 600 and 645 nm.

EXAMPLE B

A twisted nematic cell containing a mixture consisting of:
24% of p-(trans-4-propylcyclohexyl)-benzonitrile,
36% of p-(trans-4-pentylcyclohexyl)-benzonitrile,
25% of p-(trans-4-heptylcyclohexyl)-benzonitrile and
15% of 4-cyano-4'-(trans-4-pentylcyclohexyl)-biphenyl
in which, additionally, 0.9% of 6-chloro-1,5-dihydroxy-2-p-methoxyphenylanthraquinone and 0.6% of 4,8-diamino-6-chloro-1,5-dihydroxy-2-p-methoxyphenylanthraquinone have been dissolved, is colourless in the switched-on state, whereas it exhibits an absorption over the whole visible spectrum in the switched-off state.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid-crystal dielectric useful in electro-optical display elements comprising a liquid crystalline compound and at least one dyestuff, the improvement wherein at least one dyestuff is an anthraquinone dyestuff of the formula

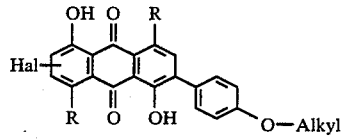

wherein Hal is halogen, the two radicals R are each H or NH$_2$ and the alkyl groups is of 1–8 C atoms.

2. A dielectric of claim 1 wherein Hal is chlorine or bromine.
3. A dielectric of claim 1 wherein Hal is in the 6-position.
4. A dielectric of claim 2 wherein Hal is in the 6-position.
5. A dielectric of claim 1 wherein alkyl is straight chained.
6. A dielectric of claim 5 wherein alkyl is methyl.
7. A dielectric of claim 1 wherein R is amino.
8. A dielectric of claim 1 wherein R is H.
9. A dielectric of claim 1 wherein said at least one dyestuff is 6-Chloro-1,5-dihydroxy-2-p-methoxyphenylanthraquinone.
10. A dielectric of claim 1 wherein said at least one dyestuff is 4,8-Diamino-6-Chloro-1,5-dihydroxy-2-p-methoxy-phenylanthraquinone.
11. In an electro-optical display element comprising a liquid crystalline dielectric, the improvement wherein the dielectric is that of claim 1.
12. In an electro-optical display element comprising a liquid crystalline dielectric, the improvement wherein the dielectric is that of claim 2.
13. In an electro-optical display element comprising a liquid crystalline dielectric, the improvement wherein the dielectric is that of claim 3.
14. In an electro-optical display element comprising a liquid crystalline dielectric, the improvement wherein the dielectric is that of claim 4.

* * * * *